(12) United States Patent
Chen et al.

(10) Patent No.: US 9,374,704 B2
(45) Date of Patent: Jun. 21, 2016

(54) METHOD AND APPARATUS FOR DEVICE-TO-DEVICE COMMUNICATION

(75) Inventors: Tao Chen, Oulu (FI); Timo Kalevi Koskela, Oulu (FI); Seppo Ilmari Vesterinen, Oulunsalo (FI)

(73) Assignee: Nokia Technologies Oy, Espoo (FI)

( * ) Notice: Subject to any disclaimer, the term of this patent is extended or adjusted under 35 U.S.C. 154(b) by 679 days.

(21) Appl. No.: 12/559,922

(22) Filed: Sep. 15, 2009

(65) Prior Publication Data

US 2011/0063995 A1    Mar. 17, 2011

(51) Int. Cl.
| | |
|---|---|
| H04W 8/26 | (2009.01) |
| H04W 76/02 | (2009.01) |
| H04L 29/12 | (2006.01) |
| H04W 28/14 | (2009.01) |
| H04W 88/04 | (2009.01) |
| H04W 92/18 | (2009.01) |

(52) U.S. Cl.
CPC ........... *H04W 8/26* (2013.01); *H04L 29/12028* (2013.01); *H04L 29/12283* (2013.01); *H04L 29/12292* (2013.01); *H04L 61/103* (2013.01); *H04L 61/2061* (2013.01); *H04L 61/2069* (2013.01); *H04W 28/14* (2013.01); *H04W 76/02* (2013.01); *H04W 88/04* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 7,308,266 B2 | 12/2007 | Du et al. | |
| 8,060,926 B1 * | 11/2011 | Ebrahimi et al. | 726/12 |
| 2005/0122946 A1 * | 6/2005 | Won | 370/338 |
| 2006/0002324 A1 * | 1/2006 | Babbar et al. | 370/325 |
| 2006/0198361 A1 * | 9/2006 | Chen et al. | 370/352 |
| 2006/0239266 A1 * | 10/2006 | Babbar et al. | 370/392 |
| 2007/0058582 A1 * | 3/2007 | Park et al. | 370/329 |
| 2007/0171910 A1 * | 7/2007 | Kumar | 370/392 |
| 2007/0242672 A1 * | 10/2007 | Grayson et al. | 370/392 |
| 2008/0112362 A1 * | 5/2008 | Korus | 370/331 |
| 2008/0113674 A1 * | 5/2008 | Baig | 455/456.3 |
| 2008/0192713 A1 * | 8/2008 | Mighani et al. | 370/338 |
| 2010/0009675 A1 * | 1/2010 | Wijting et al. | 455/426.1 |
| 2010/0067510 A1 * | 3/2010 | Roper et al. | 370/339 |
| 2010/0115067 A1 * | 5/2010 | Brant et al. | 709/221 |
| 2010/0260061 A1 * | 10/2010 | Bojahra et al. | 370/252 |
| 2010/0293289 A1 * | 11/2010 | Hsu et al. | 709/232 |
| 2011/0038349 A1 * | 2/2011 | Sun et al. | 370/331 |
| 2012/0082081 A1 * | 4/2012 | Want et al. | 370/311 |
| 2012/0320888 A1 * | 12/2012 | Annamalai et al. | 370/338 |
| 2013/0091277 A1 * | 4/2013 | Salomone et al. | 709/224 |

FOREIGN PATENT DOCUMENTS

WO    WO 2005/060182 A1    6/2005

\* cited by examiner

*Primary Examiner* — Marcus R Smith
*Assistant Examiner* — Duc Duong
(74) *Attorney, Agent, or Firm* — Alston & Bird LLP

(57) ABSTRACT

In accordance with an example embodiment of the present invention, an apparatus comprises transceiver circuitry configured to receive information from a fixed network node, initiate sending information toward the fixed network node and initiate communication with at least one peer node, the peer node being a mobile node. The apparatus further comprises a memory configured to store information received from the fixed network node, and logic circuitry operably connected to the memory, configured to derive internet protocol address information from the information received from the fixed node and to initiate sending the internet protocol address information to the at least one peer node.

20 Claims, 4 Drawing Sheets

METHOD AND APPARATUS FOR DEVICE-TO-DEVICE COMMUNICATION

TECHNICAL FIELD

The present application relates generally to direct device-to-device communication in a cellular communication network context

BACKGROUND

Mobile communication devices such as mobile telephones, personal digital assistants and mobile multimedia computers have become ubiquitous in recent decades. The ways people use the devices to interact with each other is developing according to consumers' needs and technological advances. Peer-to-peer communication has spread from the fixed Internet to the mobile setting, whereby mobile nodes can communicate with each other as a group using the services of cellular or local-area wireless networks. Direct device-to-device (D2D), mobile-to-mobile (M2M), terminal-to-terminal (T2T) or peer-to-peer (P2P) communication in the context of a cellular network has been discussed in literature. In this kind of communication mobile nodes, in addition to communicating with a fixed node of a cellular or local-area wireless network, such as a base station or access point, also communicate directly with each other using wireless links that directly connect the mobile units.

SUMMARY

Various aspects of examples of the invention are set out in the claims.

According to a first aspect of the present invention, an apparatus comprises transceiver circuitry configured to receive information from a fixed network node, initiate sending information toward the fixed network node and initiate communication with at least one peer node, the peer node being a mobile node. The apparatus further comprises a memory configured to store information received from the fixed network node, and logic circuitry operably connected to the memory, configured to derive internet protocol address information from the information received from the fixed node and to initiate sending the internet protocol address information to the at least one peer node. According to a second aspect of the present invention, a method comprises receiving in a mobile node information from a fixed node, deriving in the mobile node internet protocol address information from the received information; and initiating sending from the mobile node the internet protocol address information to a peer node According to a third aspect of the present invention, an apparatus comprises means for receiving information from a fixed node, means for deriving internet protocol address information from the received information and means for initiating sending the internet protocol address information to a peer node.

According to an embodiment of the present invention the information received from the fixed node comprises subnet information and internet protocol address information comprises at least one internet protocol address.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings.

Figure 1:
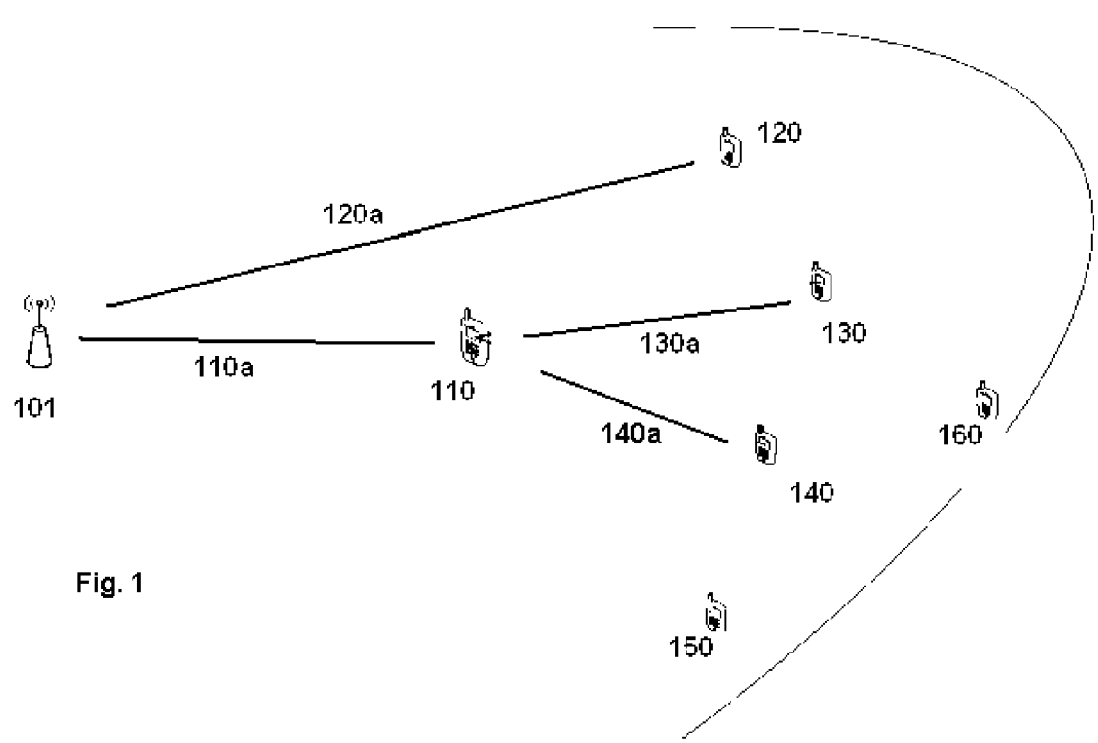
FIG. 1 depicts an example network capable of supporting embodiments of the invention.

FIG. 1 depicts an example network capable of supporting embodiments of the invention. In FIG. 1, a fixed node 101 communicates with a plurality of mobile nodes 110, 120, 130, 140, 150 and 160. The mobile nodes may be mobile terminals or cellular telephones, for example. Link 120a effects communication between the fixed node 101 and mobile node 120. Link 110a effects communication between the fixed node 101 and mobile node 110. Communication links between the fixed node 101 and mobile nodes 130, 140 and 150 have not been illustrated for clarity. In addition to communication links between the fixed node and the mobile nodes, the network of FIG. 1 also comprises other communication links, for example 130a and 140a. Link 130a is a direct wireless link between mobile node 110 and mobile node 130. Link 140a is a direct wireless link between mobile node 110 and mobile node 140. In an example embodiment, a direct wireless link includes that data is transmitted directly from one mobile node to another mobile node without traversing any intermediate nodes. Links 130a and 140a are considered examples of direct mobile-to-mobile (M2M) or peer-to-peer (P2P) links in the context of the present document. Communication between the fixed node and mobile nodes may be effected via a cellular technology such as WCDMA (Wideband Code Division Multiple Access) or LTE (Long Term Evolution) or for example wireless local area networking (WLAN). Direct communication between mobile nodes may be effected via local-area wireless links such as, for example, WLAN or Bluetooth, or a suitable cellular technology. These links may use spectrum resources of the cellular network or wireless local area network, for example. The fixed node 101 may be a cellular base station or a wireless access point, for example.

Figure 2:
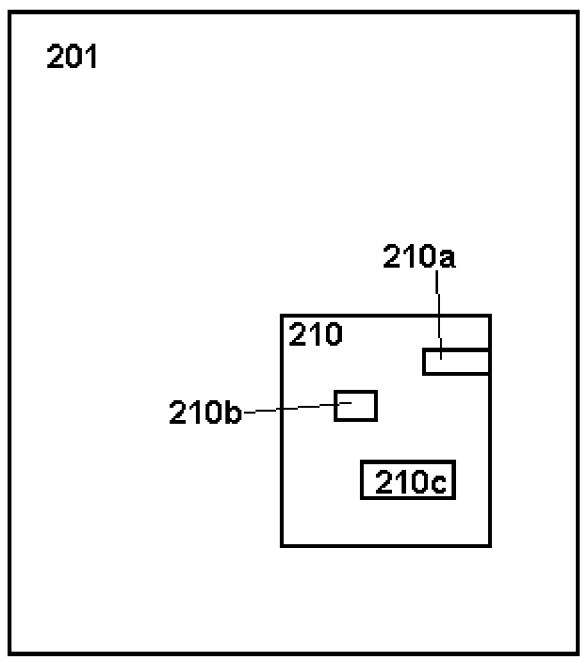
FIG. 2 depicts an example apparatus capable of supporting embodiments of the invention.

FIG. 2 depicts an example apparatus 201 capable of supporting embodiments of the present invention. The apparatus may correspond to mobile node 110 of FIG. 1. The apparatus is a physically tangible object, for example a cellular telephone, personal digital assistant, laptop, portable multimedia computer or other mobile apparatus. The apparatus may comprise a control apparatus 210, for example a digital signal processor (DSP), processor, field-programmable gate array (FPGA), application-specific integrated circuit (ASIC), chipset or controller. The apparatus may further comprise transceiver circuitry 210a configured to cause the apparatus 201 to communicate with a fixed node and/or peer nodes. The apparatus may comprise memory 210b configured to store information, for example information received from fixed or peer nodes via the transceiver circuitry 210a. The memory may be solid-state memory, dynamic random access memory (DRAM), magnetic, holographic or other kind of memory. The apparatus may comprise logic circuitry 210c configured to access the memory 210b and control the transceiver circuitry 210a. The logic circuitry 210c may be implemented as software, hardware or a combination of software and hardware. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of messages to fixed or peer nodes via the transceiver circuitry 210a. The transceiver circuitry 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transceiver circuitry 210a, memory 210b and logic circuitry 210c may be comprised in the apparatus as hardware elements such as integrated circuits or other electronic components. The same applies if the apparatus 201 does comprise a control apparatus 210 but some, or all, of the transceiver circuitry 210a, memory 210b and logic circuitry 210c are not comprised in the control apparatus 210.

Figure 3:
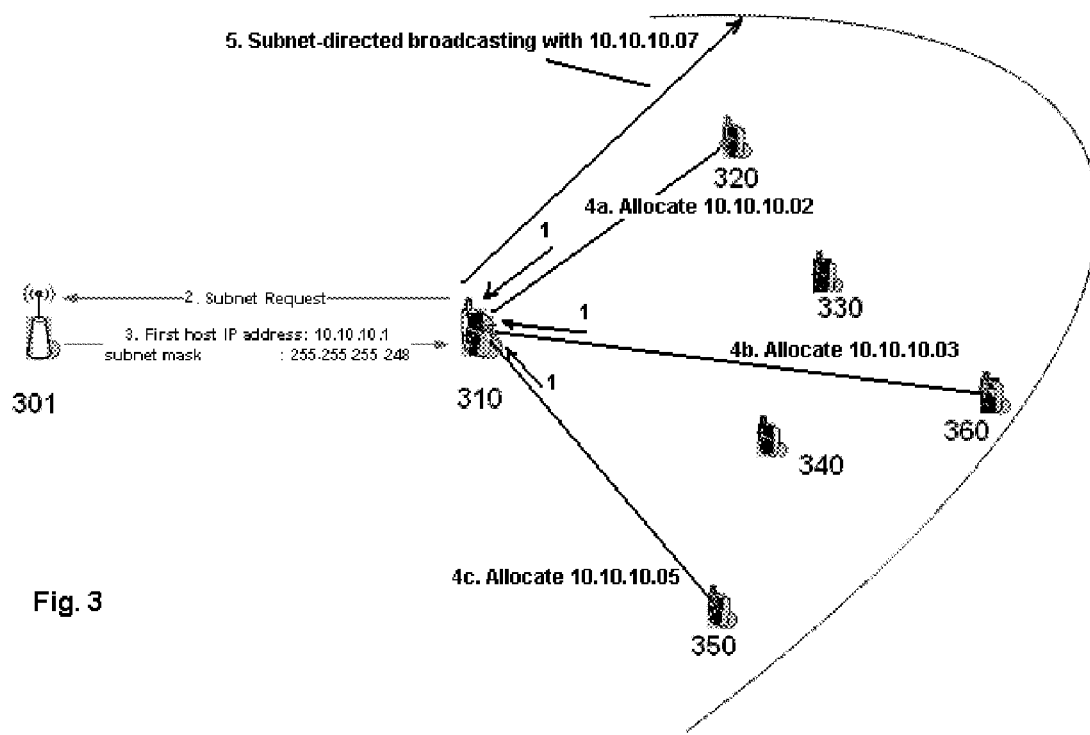
FIG. 3 depicts an example embodiment of the invention.

FIG. 3 depicts an example embodiment method for facilitating sharing of information via direct device-to-device links. In the figure, peer mobile nodes 310, 320, 330, 340, 350 and 360 wish to share information by peer-to-peer direct broadcasting or multicasting. The peer-to-peer broadcasting or multicasting may utilize resources reserved for use in communications between the mobile and fixed nodes. It is possible that the mobile nodes use time division duplex (TDD) mode for direct peer-to-peer broadcasting. TDD broadcasting may use uplink, downlink, or up- and downlink frequencies used by a frequency division duplex (FDD) cellular system in use in the fixed node 301. Re-using frequencies at low power between mobile nodes increases the effective frequency re-use factor of the network, which in turn increases system-level capacity.

In order to perform efficient direct broadcasting on the IP layer, the internet protocol (IP) addresses of the mobile nodes 310, 320, 330, 340, 350 and 360 are allocated from the same subnet, which is a set of IP addresses sharing a common prefix. The common prefix may be defined by a subnet mask or other subnet information, for example. Unless the IP addresses are allocated from the same subnet, IP layer broadcasting between the mobile nodes 310, 320, 330, 340, 350 and 360 may not be possible even if the nodes are connectable to each other via direct wireless links. Although the invention is described in terms of wireless links, in some embodiments wired connections between the mobile nodes may be used instead of wireless links. In such embodiments, physically tangible electrical connections are formed between one or more of the mobile nodes 310, 320, 330, 340, 350 and 360 by connecting them to each other by cabling.

In phase 0 of the process (not illustrated), one of the mobile nodes 310, 320, 330, 340, 350 and 360 is selected as the lead peer node. This selection may be based on, for example, link strength to the fixed node 301 and/or path losses among the direct wireless links between the peer nodes. In one embodiment, the peer nodes may exchange path loss information with each other and select as the lead peer node the peer node from among the peer nodes 310, 320, 330, 340, 350 and 360 which can broadcast successfully to the remaining set of peer nodes using the least amount of energy.

In phase 1 of the illustrated process, peer mobile nodes 320, 350 and 360 register with the peer node selected to be the lead peer node, in this example node 310. The registration messages may comprise a radio network temporary identifier (RNTI) and/or service connectivity information. An example of service connectivity information is information concerning which broadcast clusters a peer node is a member of or willing to become a member of. In an example embodiment, a broadcast cluster comprises a group of peer nodes capable of sharing information as a coherent group.

Peer nodes may register to more than one broadcast cluster. The registration messages may be communicated via the fixed node 301 or via direct wireless links between the peer nodes.

In phase 2, the lead peer node 310 sends a request for information comprising or indicating the number of registered peer nodes to the fixed node 301. In some embodiments, the request for information may be a request for subnet information. The fixed node 301 may be competent to reply independently, or the fixed node may relay the request to further fixed nodes, for example to a core network node of a cellular network. In an example embodiment, the node competent to respond to the request is a node that is competent to allocate IP addresses, for example an internet protocol base transceiver system (IP-BTS) node. In some embodiments, the fixed node may be competent to reply independently, but still decide based on, for example, network policies to relay the request to further fixed nodes. When determining which subnet to allocate, the node replying to the request may take into account an indication from the lead peer node 310 which characterizes the number of peer nodes in the broadcast cluster.

In phase 3, the lead peer node 310 receives information, for example subnet information, from or via the fixed node 301. In the example illustrated, the information comprises a subnet mask, which in this example is 255.255.255.248.

In phase 4, the lead peer node 310 may allocate one IP address from the subnet to itself, for example the first IP address of the subnet. The lead peer node 310 also derives at least one further IP address comprised in the subnet from the subnet information received from the fixed node 301. The lead peer node 310 associates the at least one further IP address with at least one further peer node 320, 350 or 360, and communicates this to the peer node or nodes concerned. This communication may be effected either via direct wireless links or via the fixed node 301. In an example embodiment, the lead peer node 310 allocates IP addresses to the other peer nodes 320, 350 and/or 360 from a subnet identified by subnet information, such as a subnet mask, received from the fixed node 301. The lead peer node may map an IP subnet broadcasting address associated with the subnet to its own RNTI or a service cluster common RNTI for handling broadcast-related messaging between the peer nodes. The mapping may be implicit or explicit. The lead peer node 310 may perform address allocation responsive to receiving address requests from the further peer nodes 320, 350 and/or 360. Allocating responsive to a request to do so may reduce unnecessary traffic between peer nodes. The lead peer node 310 may perform address allocation responsive to receiving the information from the fixed node 301. Address requests from peer nodes may be received either via direct wireless links or via the fixed node 301.

In an alternative embodiment, the lead peer node 310 may inform a subnet mask defining the broadcast cluster to the further peer nodes 320, 350 and 360 instead of allocating a separate IP address to each further peer node. In this case, the further peer nodes may configure their IP layer with the subnet mask and derive an associated IP subnet broadcasting address for broadcast cluster communication.

In case a peer node registers to more than one broadcast cluster, it may be allocated one IP address per broadcast cluster.

In phase 5, the lead peer node 310 can use the IP subnet broadcasting address to broadcast information to other peer nodes 320, 350 and 360. If desired, other peer nodes than the lead peer node 310 can use the IP subnet broadcasting address to broadcast or multicast information to their peers within the broadcast cluster. In order to facilitate the further peer nodes 320, 350 and 360 being able to broadcast within the cluster, a common RNTI may be configured for the IP subnet broadcasting address. This RNTI may be requested from the fixed network by the lead peer node 310 and communicated by the lead peer node 310 to the other peer nodes 320, 350 and 360.

In an alternative embodiment, the lead peer node 310 can allocate a multicast address instead of an IP subnet broadcasting address, for example when internet protocol version 6 (IPv6) is used for addressing. In this case, the lead peer node 310 is provided with a multicast group identity and a set of IPv6 addresses. The lead peer unit can in this case use a multicast IPv6 address for distributing information to the further peer nodes 320-360 instead of an IP subnet broadcasting address, as described above. As in the embodiment of FIG. 3, also the other peer nodes 320-360 can use the IPv6 multicast address to share information among the group of peer nodes 310-360. Multicast IP addresses may be associated with corresponding RNTIs in the peer nodes. If both IPv4 and IPv6 are supported, the lead peer node 310 may be configured to send the request of phase 2 according to the IP version which is better suited to the use.

Figure 4:
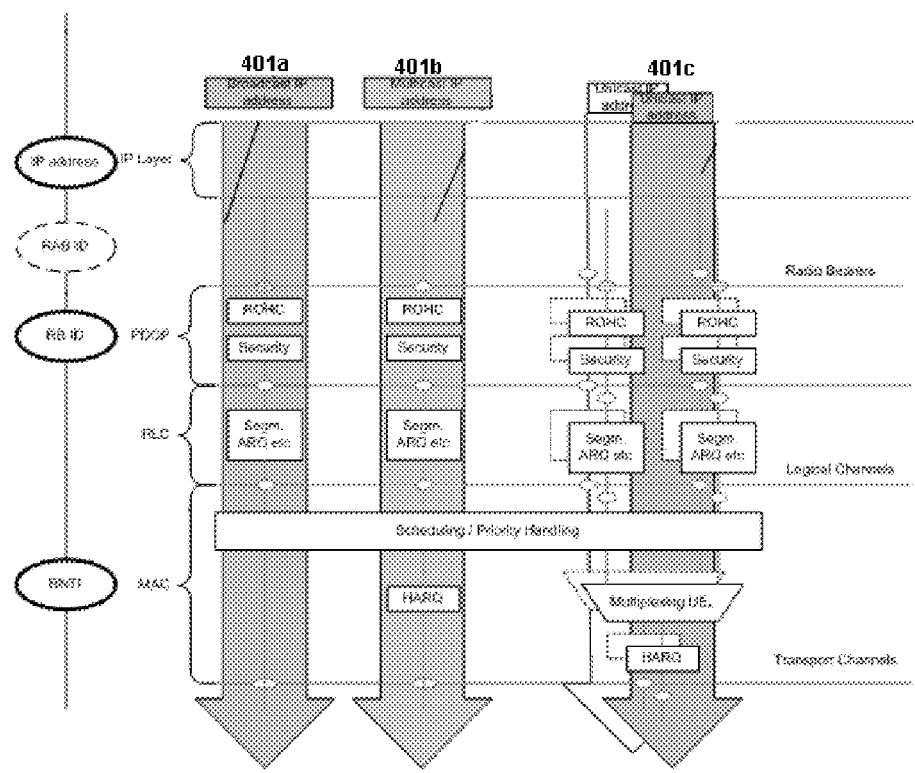
FIG. 4 depicts mapping of IP addresses to radio network temporary identifiers (RNTIs) according to some example embodiments of the invention.

FIG. 4 depicts mapping of IP addresses to radio network temporary identifiers (RNTIs) according to some example embodiments of the invention. A broadcast IP address 401a, a multicast IP address 401b and unicast IP addresses 401c are mapped to corresponding radio bearers (RB) and optionally also to radio access bearers (RABs). When a radio bearer is configured in a peer node, the radio bearer is configured with a certain RNTI. RNTIs may be used to identify transmissions between different sources and destinations, including multicast and broadcast transmissions. Peer nodes may receive a unique RNTI and a unique IP address within the subnet. A peer node may setup at least a broadcast radio bearer in order to communicate in the cluster, where the subnet broadcast IP address may be mapped to a cluster broadcast RNTI. This established broadcast channel may be further used for e.g. discovery of further peers. If unicast or multicast communications are conducted in addition to broadcast communications, additional radio bearers and corresponding RNTIs may be set up as illustrated in FIG. 4.

In FIG. 4, the broadcast data flow 401a handles broadcast transmissions intended for each peer node which is comprised in the respective broadcast cluster. These peer nodes may be configured with a common RNTI, and the broadcast IP address may be mapped to a specific bearer. A multicast data flow 401b may be intended for a specific group, which may require reliability services. A multicast IP address may be mapped to a multicast bearer and a multicast RNTI. Unicast data flows 401c correspond to unicast IP addresses, which may be mapped to respective radio bearers. Several bearers may be configured to one unicast destination.

When multiple radio bearers with separate RNTIs are configured, as in FIG. 4, transmissions can be separated at the medium access control/physical (MAC/PHY) layer. When peer nodes receive transmissions they can check whether the packet is intended for the peer node in question and either drop it or forward it to an upper layer of the peer node. If one common RNTI is used for transmissions between the peer nodes, the separation could be made at the IP layer. When using common RNTI and a peer node receives e.g. a unicast transmission not intended for it, it has to decode the packet at a radio access layer and afterwards drop it at an IP layer.

When the broadcast cluster is moving to another cell, where the lead peer node will communicate with a new fixed node, the common RNTI may be changed in case it collides with a RNTI allocation in the new cell. To mitigate these changes, in networks with central control a set of RNTIs may be reserved for cluster broadcasting use so that a cluster can keep the same RNTI throughout the network.

Without in any way limiting the scope, interpretation, or application of the claims appearing below, a technical effect of one or more of the example embodiments disclosed herein is facilitating IP-level broadcasting in a peer-to-peer cluster in a fixed-network context. Another technical effect of one or more of the example embodiments disclosed herein is reusable IP address allocation, wherein peer nodes may use the same IP addresses for broadcast and other data. Another technical effect of one or more of the example embodiments disclosed herein is that the lead peer node may select IPv4 or IPv6 depending on the network context.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
    logic circuitry operably connected to a memory and configured to determine that the apparatus comprises a lead node among a broadcast cluster of peer nodes, wherein determining that the apparatus comprises the lead node is based on a link strength between the apparatus and a fixed node or path losses among direct wireless links between the peer nodes in the broadcast cluster;
    transceiver circuitry configured to
        receive subnet information from an access point, the subnet information comprising a subnet mask,
        initiate sending information toward the access point, and
        initiate communication with a peer node in the broadcast cluster using a radio network temporary identifier (RNTI) associated with the apparatus or associated with the broadcast cluster, the peer node and the apparatus being embodied by mobile nodes;

memory configured to store the subnet information received from the access point; and wherein the logic circuitry is further configured to derive, in response to receiving a request for an internet protocol address from the peer node in the broadcast cluster, an internet protocol address from the subnet information received from the access point, wherein the request from the peer node utilizes a radio network temporary identifier (RNTI) associated with the lead node or a common RNTI for the broadcast cluster, and initiate allocation of the internet protocol address to the at least one peer node.

2. The apparatus of claim 1, wherein the logic circuitry is further configured to initiate allocation of the internet protocol address by causing the internet protocol address to be sent directly to the peer node.

3. The apparatus of claim 1, wherein the logic circuitry is further configured to initiate allocation of the internet protocol address by causing the internet protocol address to be sent to the peer node via the access point.

4. The apparatus of claim 1, wherein the request is received directly from the peer node.

5. The apparatus of claim 1, wherein the request is received indirectly from the peer node.

6. The apparatus of claim 1, wherein the logic circuitry is further configured to initiate requesting subnet information from the access point.

7. The apparatus of claim 1, wherein the apparatus is not an access point.

8. A method, comprising:
determining that a mobile node comprises a lead node among a broadcast cluster of peer nodes, wherein determining that the mobile node comprises the lead node is based on a link strength between the mobile node and a fixed node or path losses among direct wireless links between the peer nodes in the broadcast cluster;

receiving, at the lead node, subnet information from an access point, the subnet information comprising a subnet mask;

deriving, by the lead node in response to receiving a request for an internet protocol address from a peer node in the broadcast cluster, an internet protocol address from the received subnet information, wherein the request from the peer node utilizes a radio network temporary identifier (RNTI) associated with the lead node or a common RNTI for the broadcast cluster; and causing, by the lead node, the internet protocol address to be allocated to the peer node, the peer node being embodied by another mobile node.

9. The method of claim 8, wherein causing the internet protocol address to be allocated comprises causing the internet protocol address to be sent directly to the peer node.

10. The method of claim 8, wherein causing the internet protocol address to be allocated to the peer node comprises causing the internet protocol address to be sent to the peer node via the access point.

11. The method of claim 8, wherein the request is received directly from the peer node.

12. The method of claim 8, wherein the request is received indirectly from the peer node.

13. The method of claim 8, further comprising requesting subnet information from the access point.

14. The method of claim 8, wherein the mobile node is not an access point.

15. An apparatus, comprising:
at least one processor; and
at least one memory including computer program code, the at least one memory and the computer program code being configured to, with the at least one processor, cause the apparatus to at least:
determine that the apparatus comprises a lead node among a broadcast cluster of peer nodes, wherein determining that the apparatus comprises the lead node is based on a link strength between the apparatus and a fixed node or path losses among direct wireless links between the peer nodes in the broadcast cluster;
receive subnet information from an access point, the subnet information comprising a subnet mask;
derive, in response to receiving a request for an internet protocol address from a peer node in the broadcast cluster, an internet protocol address from the received subnet information, wherein the request from the peer node utilizes a radio network temporary identifier (RNTI) associated with the apparatus or a common RNTI for the broadcast cluster; and
cause the internet protocol address to be allocated to the peer node, the peer node and the apparatus being embodied by mobile nodes.

16. The apparatus of claim 15, wherein the apparatus is caused to cause the internet protocol address to be allocated to the peer node by causing the internet protocol address to be sent directly to the peer node.

17. The apparatus of claim 15, wherein the apparatus is caused to cause the internet protocol address to be allocated to the peer node by causing the internet protocol address to be sent to the peer node via the access point.

18. The apparatus of claim 15, wherein the apparatus is further caused to request subnet information from the access point.

19. The apparatus of claim 15, wherein the apparatus is not an access point.

20. A computer program product comprising a non-transitory computer-readable medium bearing computer program code embodied therein, the computer program code being configured to, upon execution, cause an apparatus to at least:
determine that the apparatus comprises a lead node among a broadcast cluster of peer nodes, wherein determining that the apparatus comprises the lead node is based on a link strength between the apparatus and a fixed node or path losses among direct wireless links between the peer nodes in the broadcast cluster;
receive subnet information from an access point, the subnet information comprising a subnet mask;
derive, in response to receiving a request for an internet protocol address from a peer node in the broadcast cluster, an internet protocol address from the received subnet information, wherein the request from the peer node utilizes a radio network temporary identifier (RNTI) associated with the apparatus or a common RNTI for the broadcast cluster; and
cause the internet protocol address to be allocated to the peer node, the peer node and the apparatus being embodied by mobile nodes.

* * * * *